(12) United States Patent
Rhetat et al.

(10) Patent No.: US 9,027,468 B2
(45) Date of Patent: May 12, 2015

(54) PRESSURE COOKER FITTED WITH AN INFORMATION WINDOW

(75) Inventors: Eric Jacques Rhetat, Dijon (FR); Philippe Roussard, Is sur Tille (FR)

(73) Assignee: SEB S.A., Ecully Cedex (FR)

( * ) Notice: Subject to any disclaimer, the term of this patent is extended or adjusted under 35 U.S.C. 154(b) by 690 days.

(21) Appl. No.: 12/174,965

(22) Filed: Jul. 17, 2008

(65) Prior Publication Data
US 2009/0020021 A1 Jan. 22, 2009

(30) Foreign Application Priority Data

Jul. 20, 2007 (FR) .................................. 07 05262

(51) Int. Cl.
A47J 43/28 (2006.01)
A47J 27/08 (2006.01)
B65D 45/00 (2006.01)

(52) U.S. Cl.
CPC .................................. *A47J 27/0802* (2013.01)

(58) Field of Classification Search
USPC ............ 219/439, 440; 99/325, 330, 331, 337, 99/342, 467; 116/277; 220/315, 316
See application file for complete search history.

(56) References Cited

U.S. PATENT DOCUMENTS

| | | | | |
|---|---|---|---|---|
| 580,252 A | * | 4/1897 | Christie | 116/277 |
| 2,254,570 A | * | 9/1941 | Hailey | 220/367.1 |
| 4,330,069 A | * | 5/1982 | Bauer | 220/203.18 |
| 4,433,579 A | * | 2/1984 | Horn | 73/715 |
| 4,627,417 A | * | 12/1986 | von der Becke et al. | 126/369 |
| 5,265,522 A | * | 11/1993 | Schultz | 99/343 |
| 5,613,424 A | * | 3/1997 | Chameroy et al. | 99/337 |
| 5,839,357 A | * | 11/1998 | Ha et al. | 99/337 |
| 6,019,029 A | * | 2/2000 | Chan | 99/337 |
| 6,257,124 B1 | * | 7/2001 | Chen | 99/337 |
| 6,425,320 B1 | * | 7/2002 | Chameroy et al. | 99/337 |
| 6,450,361 B1 | * | 9/2002 | Mendelson et al. | 220/573.1 |
| 6,523,459 B1 | * | 2/2003 | Chameroy et al. | 99/337 |
| 6,705,209 B2 | * | 3/2004 | Yang et al. | 99/337 |
| 2003/0010216 A1 | * | 1/2003 | Yang et al. | 99/337 |
| 2003/0209551 A1 | * | 11/2003 | Park | 220/573.1 |
| 2004/0256256 A1 | * | 12/2004 | Preece | 206/308.1 |
| 2005/0132894 A1 | * | 6/2005 | Seurat Guiochet et al. | 99/337 |
| 2005/0178274 A1 | * | 8/2005 | Cartigny et al. | 99/337 |

FOREIGN PATENT DOCUMENTS

DE 29921808 U1 * 3/2000

* cited by examiner

*Primary Examiner* — Dana Ross
*Assistant Examiner* — Lindsey C Teaters
(74) *Attorney, Agent, or Firm* — McClure, Qualey & Rodack, LLP

(57) ABSTRACT

The invention relates to a domestic cooking pot (1) comprising means of controlling (7) at least part of its operation, wherein said control means (7) have a mobile mounting between a plurality of positions, wherein said pot (1) is characterized in that it is further fitted with an information window (8) and at least an indicator (10) that is representative of one of the positions of the control means (7), and in that the window (8), the indicator (10) and the control means (7) work together so that said indicator (10) appears in the window (8) when the control means (7) are in the corresponding position.

18 Claims, 4 Drawing Sheets

PRESSURE COOKER FITTED WITH AN INFORMATION WINDOW

CROSS REFERENCE TO RELATED APPLICATIONS

This application claims priority to copending French Patent Application No. 07 05262 filed Jul. 20, 2007, which is entirely incorporated herein by reference.

BACKGROUND

This invention relates to the general technical field of kitchen utensils of the cooking recipient type, and especially to that of pressure cookers, which is to say pressurised cooking pots designed to cook food they contain using pressurised steam.

This invention relates more particularly to a domestic pressure cooker comprising means of controlling at least part of its operation, wherein said control means have a mobile mounting between a plurality of positions.

Domestic pressure cookers are well-known. They are usually composed of a metallic pan designed to accommodate food and a lid, also metallic, designed to be added and locked onto the pan to form with the latter an impervious cooking chamber. Such a pressure cooker is designed to be subjected to the influence of a source of heat (such as for example a cooking hob) so as to permit the increase in pressure and temperature of the chamber and thus the pressurised cooking of the food contained therein.

The operation of these known pressure cookers is controlled by different parts such as for example:

means of locking/release capable of locking and releasing the lid with respect to the pan,
  a pressure regulation valve which permits the pressure in the chamber to be maintained at a predetermined level called the operating pressure;
  or even a decompression part, permitting the pressure to be lowered in the chamber, especially at the end of the cooking cycle, so that the user may open the lid in acceptably safe conditions.

Each of these functions may be controlled by the user by one or several corresponding control means designed to be manually actuated by the user.

In particular, a pressurised cooking appliance is known that is equipped with a rotary control knob mounted on its lid, wherein said rotary control knob permits the user to control manually both the locking/release of the lid with respect to the pan and the decompression of the chamber.

More precisely, the rotary control knob has a mobile mounting in rotation between three indexed positions corresponding respectively to specific operating modes of the appliance. Consequently, the rotary knob in question may be placed in a first position called "locked and sealed", corresponding to the locking of the lid onto the pan and the sealed closure of the chamber so that the latter may increase in pressure. The rotary knob may also be placed in a second position, distinct from the first position, called the "locked and decompression" position. This second position corresponds to the locking of the lid onto the pan as well as bringing the inside of the chamber in communication with the outside to lower the pressure inside the chamber.

Finally, the rotary knob may also be placed in a third position, distinct from the two other positions, called the "opened and released" position, which permits the user to separate the lid from the pan in complete safety, as soon as the pressure inside the chamber drops below a predetermined safety level.

The control knob comprises a handle designed to be turned manually by the user, wherein said handle opens out at its base into a circular crown which is made from the same material as said handle and on which there is a visual positioning identification mark. The control knob is itself attached to a plastic cover with a fixed mounting on the lid, so that the handle and its base turn in relation to the cover.

Pictograms corresponding to the three different positions that the control knob may adopt are present on the cover.

Consequently, for each indexed position of the control knob (position to which a respective operating mode of the pressure cooker corresponds), the visual identification mark on the crown of said knob is located opposite the corresponding pictogram on the fixed cover. In this way, by turning the handle until the identification mark on its crown is aligned with one of the pictograms on the cover, it is possible for the user to select the indexed position (and thus the corresponding operating mode) desired. Reciprocally, the user is able to determine, at all times, by looking at the pictogram opposite the identification mark, in which position the control knob is located and thus which is the specific operating mode currently selected on the pressure cooker.

While such a pressure cooker generally provides full satisfaction, nevertheless it has certain disadvantages.

Consequently, the known pressure cookers compliant with the above description permanently display to the user all of the pictograms of the cover, such that the user is not directly able to determine instantly in which position the control knob is positioned and therefore which operating mode of the pressure cooker is selected. In order to access the desired information, the user is in fact obliged to search, by a positive action, which pictogram is aligned with the identification mark. Therefore quite often, especially for inexperienced users, this observation is not made automatically and consequently the position of the control knob may not correspond to that desired. This lack of ergonomics and clarity of information may lead the user to using the pressure cooker incorrectly (the user thinks for example that a pressurised cooking cycle has been started whereas the pressure cooker has inadvertently been left in the decompression position) or even cause, in the most critical case and combined with other factors, a possible risk of accidents, especially due to burning.

This problem is even more present given that the identification mark on the knob, as the pictograms on the cover, may be relatively difficult to distinguish visually, so that their possible alignment is also difficult to distinguish.

This is due to the fact that for reasons of industrial organisation and durability, the identification mark and the pictograms are generally made by simple forming (hollow or raised) in the component material respectively forming the crown and the cover, without additional colouring.

The identification mark and the pictograms consequently appear in matching tones with respect to the part on which they are marked, which consequently makes them difficult to distinguish, in particular for inexperienced users or those with impaired vision.

Given the relative deficiency of ergonomics and clarity of information related to the visual identification system of the prior art described above, it is necessary for the user to be allowed to view directly the state of certain parts. In particular, it cannot be envisaged, with such a visual identification system, to completely conceal the locking system of the lid onto the pan. On the contrary, for comfort and safety of use, the locking system needs to be kept permanently in view of the user, so that the latter is able to determine precisely if the lid is locked or not onto the pan. However, the fact that the locking system is permanently visible may contribute to what the user may perceive of the pressure cooker as being a complex and dangerous machine, which is not the case.

Similarly, the permanent viewing by the user of all of the pictograms may alter the perception of the user of the degree of difficulty in using the pressure cooker. This degree of difficulty is in fact low or even null, however the multiplication of the visual symbols may allow certain users think that their pressure cooker is a device that is extremely difficult to use and which requires a long and tiresome learning process.

SUMMARY

The assigned purposes of the invention consequently aim to overcome the various disadvantages mentioned above and to propose a new domestic cooking pot whose use is particularly simple, intuitive, ergonomic and safe.

Another purpose of the invention aims to propose a new domestic cooking pot whose use is based on simple and cheap principles.

Another purpose of the invention aims to propose a new domestic cooking pot whose construction is based on well known and tested general principles.

Another purpose of the invention aims to propose a new domestic cooking pot that permits the user to determine, in a very accessible manner and instantly, which operating mode is selected for the pot.

Another purpose of the invention aims to propose a new domestic cooking pot which provides the user with very clear information on its most important functions.

Another purpose of the invention aims to propose a new domestic cooking pot whose external appearance reassures the user.

Another purpose of the invention aims to propose a new domestic cooking pot which limits the possibilities of the user committing errors when handling it.

Another purpose of the invention aims to propose a new domestic cooking pot whose design and assembly are simplified.

Another purpose of the invention aims to propose a new domestic cooking pot whose design is particularly compact and cheap.

The assigned purposes of the invention are achieved by means of a domestic cooking pot comprising control means at least part of its operation, wherein said control means have a mobile mounting between a plurality of positions, wherein said cooking pot is characterised in that it is further equipped with an information window and at least one indicator that is representative of one of the positions of the control means, and in that the window, the indicator and the control means work together so that said indicator appears in the window when the control means are in the corresponding position.

Other specific aspects and advantages of the invention will appear and in more detail upon reading the following description, in reference to the appended drawings provided by way of illustration and in no way restrictively, in which:

DETAILED DESCRIPTION

The invention relates to a domestic cooking pot 1, which is to say a kitchen recipient designed to cook food on a hob in a domestic context.

Preferably, the domestic cooking pot 1 is formed by a pressure cooker, which is to say a pressurised cooking pot. Of course, the invention is not limited to a pressure cooker, and also relates to cooking pots operating at atmospheric pressure (or at least close to atmospheric pressure).

The invention is particularly advantageous when the cooking pot 1 is formed by a pressure cooker. For this reasons, and to simplify the description, the following description will refer solely to a pressure cooker, purely by way of illustration and in no way restrictively.

The pressure cooker 1 compliant with the invention is designed to cook various foods under pressure in a domestic context, It thus forms a domestic pressure cooker. The pressure cooker 1 compliant with the invention is therefore a kitchen utensil of a portable nature (which is to say it may be moved manually) and independently.

Advantageously, the pressure cooker 1 compliant with the invention is a thermally passive cooking pot, designed to increase in pressure under the effect of an external source of heat, such as a cooking hob.

Preferably, the pressure cooker 1 compliant with the invention comprises at least a pan 2 forming a cooking recipient and advantageously substantially with a revolution symmetry according to an axis X-X'. In the rest of the description, the adjective "axial" refers to the direction of this axis of symmetry X-X', a direction which is similar to the vertical direction when the appliance is in normal use, the pan 2 is for example and usually manufactured by stamping a blank made from a metallic material such as aluminium or stainless steel.

The pressure cooker 1 compliant with the invention also comprises a lid 3 designed to be added onto said pan 2 to form a cooking chamber with the latter. The cooking chamber is preferably substantially impervious, which is to say sufficiently hermetic to allow the pressure inside it to increase. The lid 3 is advantageously made of a metallic material (for example stainless steel) and preferably has a general disc shape, that is complementary to the shape of the pan 2.

Figure 1:
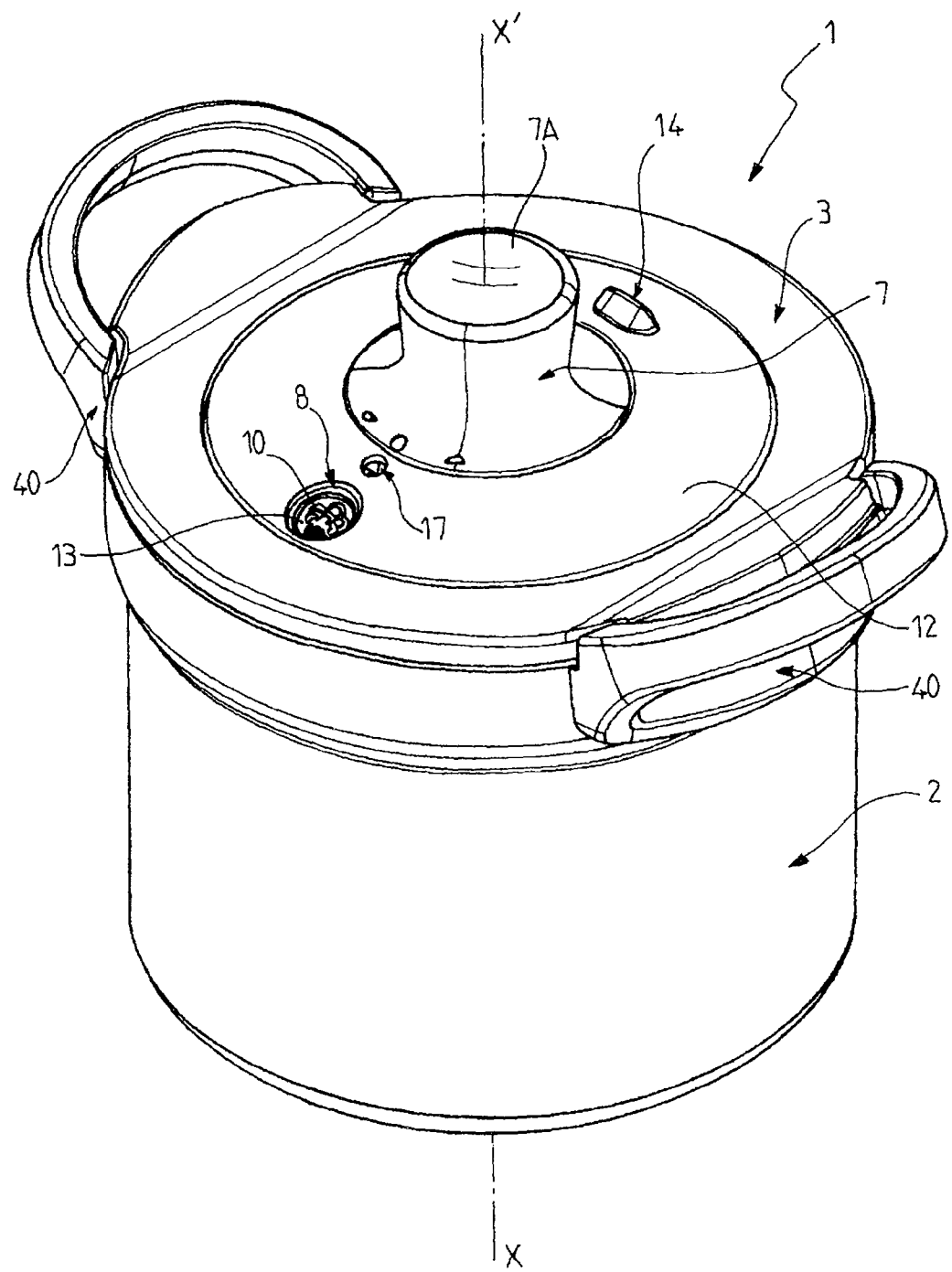
FIG. 1 illustrates, according to a general perspective view, a cooking pot compliant with the invention, composed in this case by a domestic pressure cooker, whose control means are positioned in a "locked and decompression" position
Figure 2:
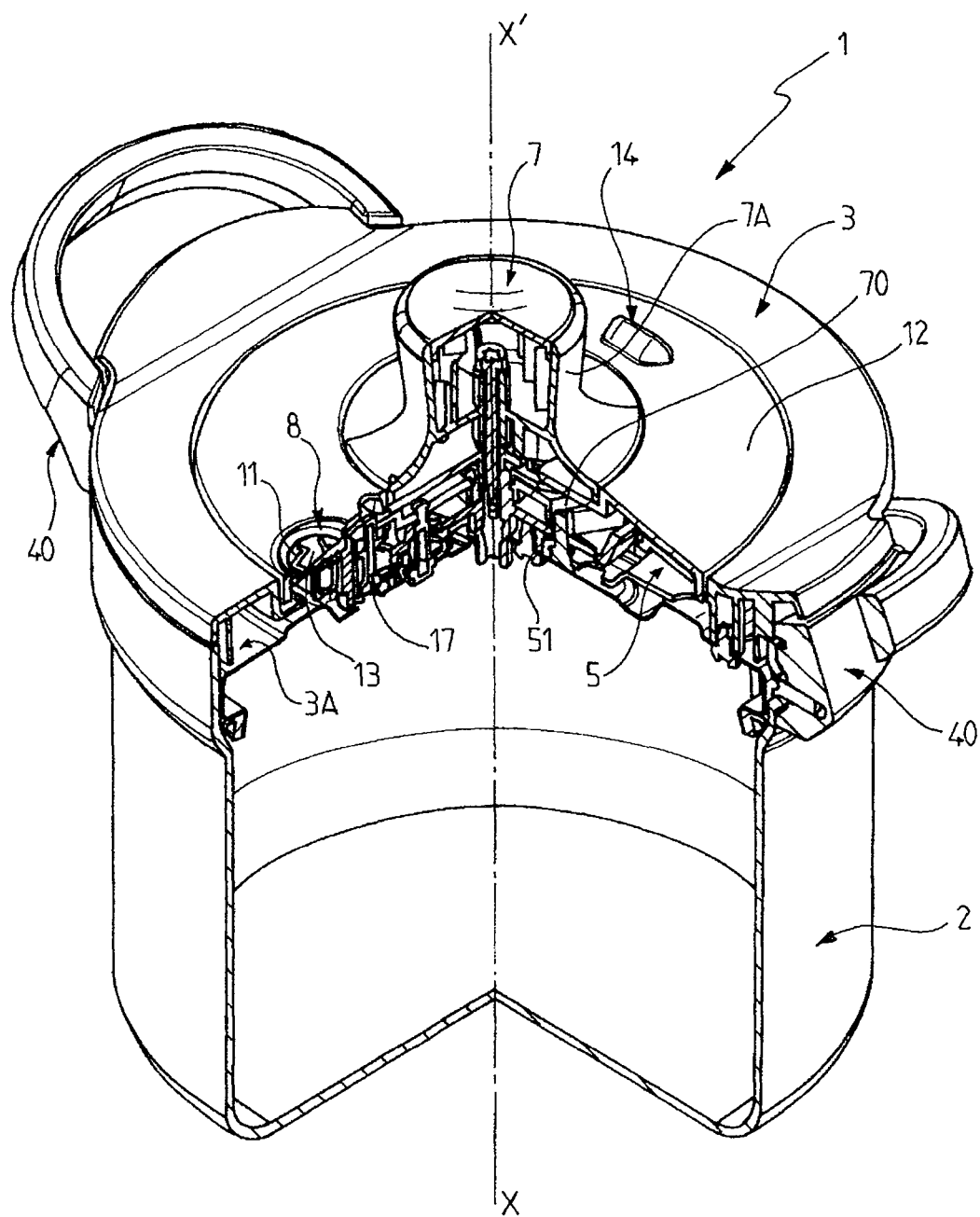
FIG. 2 illustrates, according to a general partially cross sectioned perspective view, according to two cross sectional planes that are substantially perpendicular, the pressure cooker of FIG. 1 whose control means are this time positioned in an "open" position.

Advantageously, the lid 3 may be locked or released as required on the pan 2, wherein locking the lid 3 permits the chamber to increase in pressure without the lid 3 escaping under the effect of the pressure. For this purpose, the pressure cooker 1 preferably comprises locking/release means 4 of the lid 3 onto the pan 2. The locking/release means 4 may be of any type known to a person skilled in the art and usually moves between a configuration where the lid 3 is locked in relation to the pan 2 (illustrated in the FIGS. 1, 3 and 4) in which the lid 3 is attached to the pan 2, and a configuration where the lid 3 is released in relation to the pan 2 (illustrated in particular in FIGS. 2 and 5), in which the lid 3 may be freely separated from the pan 2.

Preferably, the locking/release means 4 comprise at least one part 5, 6 for locking the lid 3 onto the pan 2. The locking part 5, 6 has a mobile mounting on the lid 2, substantially in radial translation with respect to the X-X' axis, by means of at least one corresponding drive means between an indexed locking position (illustrated for example in FIG. 3) and an indexed release position (illustrated for example in FIG. 5).

According to one embodiment not shown, each locking part 5, 6 may comprise a clamp designed to clamp the peripheral edges of the pan 2 and the lid 3. Said clamp may be in the form of a metallic plate, with a U shaped profile at its outside end, as is itself well known to a person skilled in the art.

According to the preferred alternative embodiment illustrated in the figures, the pressure cooker 1 compliant with the invention comprises two locking parts 5, 6 formed by bifid segments each with two respective locking pins 5A, 5B, 6A, 6B, wherein said segments are positioned opposite, diametrically opposed opposite the general axis of symmetry X-X' of the appliance. Advantageously, the drive means of each bifid segment consist of a respective drive arm, wherein said drive arm may be for example made of the same material as the corresponding segment. Locking openings 50A, 50B, 60A, 60B that are complementary to the pins 5A, 5B, 6A, 6B are fitted to the pan 2, such that locking the lid 3 corresponds to engaging the pins 5A, 5B, 6A, 6B into the respective complementary openings 50A, 50B, 60A, 60B (see FIG. 3), in the same way as a pin-strike plate system, substantially to prevent any movement of the lid 3 with respect to the pan 2, whereas the release of the lid 3 corresponds to the retraction and the disengagement of the pins 5A, 5B, 6A, 6B from the corresponding openings 50A, 50B, 60A, 60B so that said pins do not engage with said openings 50A, 50B, 60A, 60B.

The means 4 of locking/releasing the lid 3 to the pan 2 are however not limited to a system of segments or clamps and may for example be based on other principles, well known in themselves, such as means or locking/release with bayonets or means of locking/release with clamps.

The pressure cooker 1 compliant with the invention furthermore comprises control means 7 for at least part of its operation. In other terms, well known in itself, the control means 7 permit the user to control one or several of the functions of the pressure cooker 1, such as for example, purely by way of illustration and in no way restrictively, the locking/release of the lid 3 onto the pan 2 and/or the decompression of the cooking chamber and/or the adjustment of the operating pressure level.

In the example illustrated in the figures, the pressure cooker 1 comprises single control means 7. Of course, the invention is absolutely not limited to a pressure cooker with single control means 7 and it may be envisaged, without this leaving the scope of the invention, that the pressure cooker 1 comprises several control means, wherein each one is dedicated to a specific function (for example first control means are dedicated to controlling the locking/release of the lid onto the pan, while second control means are dedicated to controlling the decompression and possibly adjusting the operating pressure level).

Also well known in itself, the control means 7 have a mobile mounting between a plurality of positions, wherein each of these distinct positions corresponds to a specific operation of the pressure cooker 1.

For example, in the example illustrated in the figures, the control means 7 has a mobile mounting between at least one first position (illustrated in FIG. 3) and a second position (illustrated in FIG. 5), wherein the control means 7 permit the user to control at least the locking/release means 3 so that the first position corresponds to the locking and the second position corresponds to the release.

In the example illustrated in the figures, the control means 7 are designed to be actuated manually by the user. For this purpose, the control means 7 are mounted on the lid, and preferably comprise a knob 7A mounted on the lid 3 with a rotation according to the X-X' axis, wherein each position of the control means 7 consequently corresponds to a specific angular orientation of the knob 7A.

Consequently, to move from the first to the second position of the control means 7 and vice versa, the user simply has to turn the knob 7A around the X-X' axis. The knob 7A is mechanically connected to the locking parts 5, 6 so that the rotation of the knob 7A from the first to the second position causes radial (centripetal) retraction of the pins 5A, 5B, 6A, 6B while the rotation of the knob 7A from its second to its first position causes on the contrary a centrifugal radial movement of the locking parts 5, 6 permitting the pins 5A, 5B, 6A, 6B to be engaged into the corresponding locking openings 50A, 50B, 60A, 60B fitted in the pan 2. The locking parts 5, 8 may be driven by the knob 7A by any means known to a person skilled in the art.

For example and as is known in itself, the knob 7A may be attached to a plate in which drive openings 70 are fitted, wherein the locking parts 5, 6 are themselves fitted with respective pins 51 engaged into the drive openings 70, so that the rotation of the knob 7A causes the concomitant rotation of the drive openings 70 which, by a ramp effect and in combination with a translation guidance of the locking parts 5, 6, transform their rotational movement into a radial translation movement of the locking parts 5, 6.

Advantageously, the pressure cooker 1 compliant with the invention comprises a decompression part that may be activated or deactivated, fitted so that it authorises, when it is activated, a drop in the pressure inside the chamber so that the chamber may later be opened, which is to say to pass the locking/release means 4 from their locking configuration to their release configuration to permit the lid 3 to be freed. For this purpose, the decompression part may preferably be activated regardless of the pressure level in the chamber, and in particular may be activated when this pressure level corresponds to the operating pressure (regulated by a regulator valve, as is well known in itself) of the pressure cooker 1. The functions of the decompression part that may be activated or deactivated are therefore especially as follows:

when the decompression part is deactivated, substantially it does not permit any leak of steam from the inside of the chamber to the outside and permits the pressure in the chamber to rise;

when the decompression part is activated, it places the inside of the chamber in communication with the outside to create a leak of steam causing a drop in the pressure inside the chamber, wherein said pressure changes from a first value (corresponding for example to the operating pressure) to a second lower value, compatible with the release of the lid in acceptable safety conditions for the user.

The decompression part may consist of any means known to a person skilled in the art.

According to the particularly advantageous embodiment illustrated in the figures, the control means 7 permit the user to control not just, as previously explained, the locking/release means 4 but also the decompression part. For this purpose, the control means 7 have a mobile mounting between at least a third and a fourth position, and permit the user to control the decompression part so that when the control means 7 occupy their third position (illustrated in FIG. 3), the decompression part is deactivated, whilst when the control means occupy their fourth position (illustrated in FIG. 5), the decompression part is activated.

Consequently, in the example illustrated in the figures, the pressure cooker 1 comprises single and common control means 7 permitting both the locking/release of the lid 3 onto the pan 2 and the activation/deactivation of the decompression part. Of course, it may be envisaged, without this leaving the scope of the invention, that the control means 7 only control one of these two functions, or even another function (calibration of the operating pressure for example).

Advantageously, the first and third positions of the control means 7 (and therefore the knob 7A) are the same. Consequently, the single position illustrated in FIG. 3 of the control means 7 (which corresponds to the first and third positions mentioned above) is a "locked and sealed" position in which the cooking chamber may increase in pressure, given that the lid 3 is locked onto the pan 2 and the decompression part is deactivated.

Advantageously, the second and fourth positions of the control means 7 are also the same. In this case, the single position illustrated in FIG. 5 (which corresponds to the second and fourth positions mentioned above) is a "open" position corresponding to a release of the lid 3 from the pan 2 as well as a deactivation of the decompression part.

Preferably, the control means 4 are also designed so that they may be placed in an intermediate position called the "locked and decompression" position corresponding to the locking of the lid and the activation of the decompression part. This locking and decompression position is situated, in the travel of the control means 7, between the locked and sealed position and the open position. It avoids the control means 4 directly reaching the open position from its locked and sealed position when the pressure cooker is pressurised, which could otherwise be a safety problem.

In compliance with the invention, the pressure cooker 1 is fitted with an information window 8 and at least one indicator that is representative of one of the positions of the control means 7. The window 8, the indicator and the control means 7 work together so that said indicator appears in the window 8 when the control means 7 are in the corresponding position.

The invention is therefore based on the implementation of a defined zone (forming the window 8) in which information is displayed (contained in the indicator) concerning the instantaneous position in which the control means 7 are placed, and therefore relative to the instantaneous operating mode of the pressure cooker 1 corresponding to this position of the control means 7. Thanks to this technical measure, the user simply has to consult the information window 8 to have immediate access, that is perfectly clear and in no way ambiguous, to an indication concerning the instantaneous position in which the control means 7 are located.

In other terms, the general principle of the invention consists of defining an information zone (formed by the window 8), and when the control means 7 are placed in a predetermined position, generating the appearance in said window 8, which is to say inside the contour defining the latter, of any type of indicator (and for example of a visual and/or a tactile type) informing (directly or indirectly) the user of the instantaneous position in which the control means 7 are placed.

Placing the indicator in a window consequently permits particularly simple and clear information to be provided to the user, thus limiting the possibilities of errors when using the pressure cooker 1.

Of course, the invention is not restricted to a specific functional liaison between the control means 7, the window 8 and the indicator, the most important aspect is that thus functional liaison generates the appearance of the indicator in the window 8 when the control means 7 are in the corresponding position.

This functional liaison may be for example of an electrical or electronic nature. In this case, the window 8 may for example consist of a display screen, of the LCD display type, wherein the indicator is formed by a specific symbol displayed by said display when the control means 7 are in the corresponding position, a position which generates the transmission of a piece of electrical information which controls the appearance of said indicator on the display.

Preferably, the functional liaison between the window 8, the indicator and the control means 7 is however not electronic but rather, for reasons of simplicity, reliability and costs, of a mechanical nature.

In this case, which corresponds to the embodiment illustrated in the figures, the movement of the control means 7 causes a relative movement of the window 8 with respect to the indicator, so that when the control means 7 reach their corresponding position, the indicator is aligned with the window 8 so that it appears in the middle of it. In other terms, the alignment of the indicator with the window 8 is preferably obtained by manual action by the user on the control means 7, so that said control means 7 not only control, as explained above, at least part of the operation of the pressure cooker 1, but also control the relative movement of the window 8 and the indicator.

Preferably, the indicator is a visual indicator, which is to say that it provides the user with at least one piece of visual information. For example, said indicator is a pictogram symbolising the function of the pressure cooker selected by the position in which the control means 7 are placed. Of course, the invention is not restricted to a visual type indicator, and it may be envisaged that the indicator is of another type, and for example either a tactile indicator, or even a combination of two different types (tacto-visual indicator for example).

Preferably, as illustrated in the figures, the pressure cooker 1 comprises a plurality of indicators 9, 10, 11, wherein each of them are representative of one respective position of the control means 7.

Consequently, in the example illustrated in the figures, the pressure cooker 1 comprises three different indicators, which is to say:

a first indicator 9 formed by a pictogram symbolising a closed pressure cooker, wherein this first indicator 9 is designed to appear in the window 8, to be seen by the user, when the control means 7 are in their locked and sealed position;

a second indicator 10 formed by a pictogram symbolising a cloud of steam, wherein this second indicator 10 is designed to appear in the window 8, to be seen by the user, when the control means 7 are in their locked and decompression position;

and a third indicator 11 formed by a pictogram symbolising an open pressure cooker, wherein this third indicator is designed to appear in the window 8, to be seen by the user, when the control means 7 are in their open position.

Advantageously, the information window 8 is, like the control means 7, mounted on the lid 3. This permits the user to benefit from particularly easy access to the information displayed in the window 8, given that the latter is situated (as it is mounted on the lid 3) on top of the pressure cooker 1 such that it is directly exposed to the view of the user.

Advantageously the pressure cooker 1 comprises a cover 12 in which an opening forming the viewing window 8 is fitted. For example, as is more particularly visible in FIG. 2, the lid 3 comprises a main metallic body 3A on which is added and attached, in its centre, a control module comprising the knob 7A and the cover 12, wherein the latter is in the form of a circular crown surrounding the base of the knob 7A, According to the embodiment illustrated in the figures, the pressure cooker 1 also comprises an indicator part 13 bearing at least the indicator (if there is only one of the latter) and preferably all of the indicators 9, 10, 11. The cover 12 and the indicator part 13 have mobile mountings with respect to one another.

The control means 7 are then designed to control the relative movement 20 of the cover 12 and the indicator part 13 so that the indicator is positioned opposite the window 8 when the control means 7 are in the corresponding position.

Advantageously, the viewing window 8 is fixed in position, which is to say that it is designed to remain immobile with respect to the rest of the pressure cooker 1, and especially with respect to the lid 3 onto which it is preferably mounted. In this case, the indicator part 13 is in return mobile, in particular with respect to the viewing window 8 and the lid 3, wherein said indicator part 13 is connected to the control means 7 so that the latter controls its movement.

Advantageously, and as in the embodiment illustrated in the figures, the indicator part 13 has a mobile mounting in rotation, preferably around the X-X' axis. In this case, the control means 7 also preferably have a mobile mounting in rotation, preferably around the same X-X' axis.

The control means 7 may be designed to control the movement of the indicator part 13 directly, wherein the latter is for example directly attached to the knob 7A so that it may turn with the latter around the X-X' axis. Consequently when the user manually turns the knob 7A, this causes the rotation around the X-X' axis of the indicator part 13 with respect to the window 8 which remains fixed with respect to the lid 3 and the pan 2. In other terms, in the embodiment illustrated in the figures, the cover 12 has a fixed mounting with respect to the lid 3 whereas the indicator part 13 is attached to the control means 7 and moves with the latter.

The control means 7 may however indirectly control the movement of the indicator part 13, by means of an intermediate transmission element which drives the indicator part 13 under the effect of the movement created by the user of the control means 7.

In the example illustrated in the figures, the indicator part 13 comprises a plate attached to the knob 7A and mounted in rotation around the X-X' axis, wherein said plate is situated underneath the cover 12, between the main metallic body 3A of the lid 3 and said cover 12. The cover 12 itself is formed by an annular plate, which comprises in its thickness an opening passing through it forming the window 8. Said opening has for example, as illustrated in the figures, a circular form. The pictograms forming the visual indicators 9, 10, 11 are positioned one after the other, on the upper face of the indicator part 13 situated opposite the cover 12.

The visual indicators 9, 10, 11 are positioned according to an arc of a circle passing through the centre of the opening 8, so that by rotation of the knob 7A, it is to position alternatively and as required one or another of the pictograms forming the visual indicator 9, 10, 11 in line with the window 8, so that the pictogram in question is visible by the window.

Advantageously as illustrated in the figures, the cover 12 is designed to hide all of the visual indicators 9, 10, 11, except for the indicator aligned with the window 8 and that is visible from the outside of the pressure cooker 1 by the user. Consequently, the user benefits from information that is both reliable and clear as only the pictogram corresponding to the instantaneous position (and therefore the instantaneous operation selected) of the control means 7 is visible to the user, wherein the cover 12 is made of a material that is sufficiently opaque, or even totally opaque, to hide the other pictograms.

It may however be envisaged, without this leaving the scope of the invention, that the other pictograms also remain permanently visible, even if such an embodiment is not preferred as it may introduce confusion in the mind of the user.

Consequently, the preferred embodiment illustrated in the figures provides a particularly ergonomic nature to the pressure cooker 1, as it provides the user with simple, single and clear information on the mode of operation selected, wherein the clarity of the information lies not only in the fact that only a single and unique pictogram may be displayed at any one time, but also in the possibility offered by the design retained of having pictograms 9, 10, 11 of different colours from their direct visual environment formed by the cover 12. and in a reliable and durable manner, without complicating the manufacture or increasing the cost of the latter. Indeed, the contrast between the pictograms 9, 10, 11 and the cover 12 is simply obtained by selecting materials of different colours to make the cover 12 and the indicator part 13, without this requiring additional surface colouring for example.

The invention is particularly advantageous in the case where, as illustrated in the figures, the pressure cooker 1 comprises a display 40 to hide the locking/release means 4 of the lid 3 on the pan 2 from the user's view when the lid 3 is added onto the pan 2.

Indeed, the user is in this case unable to determine in which configuration the locking/release means 4 are positioned other than indirectly, by means of the information system provided for this purpose.

The use of an information system based on the use, in compliance with the invention, of a window 8 permitting an indicator 9, 10, 11 to be displayed is particularly adapted as it permits the user to determine in a particularly simple and reliable manner the configuration of the locking/release means 4, while it is impossible for the user to view directly the configuration in question.

In the embodiment illustrated in the figures, the display 40 is formed by the handles of the pressure cooker themselves, which are mounted on the pan 2 to hide the locking openings 50A, 50B, 60A, 60B.

We will now describe the operation of the cooking appliance 1 in compliance with the invention, according to the embodiment illustrated in the figures.

Firstly, the user places food to be cooked in the pan 2, which is to say directly in it or indirectly, by means of a removable basket contained inside the pan 2.

The user then adds the lid 3 to the pan 2. At this moment, the single control means 7 are in their open position (release and decompression) illustrated in FIG. 5, while the pictogram 11 symbolising the open position is aligned with the window 8, so that the user clearly distinguishes this pictogram and only this one, which informs the user of the state of operation of the pressure cooker 1.

Figure 3:
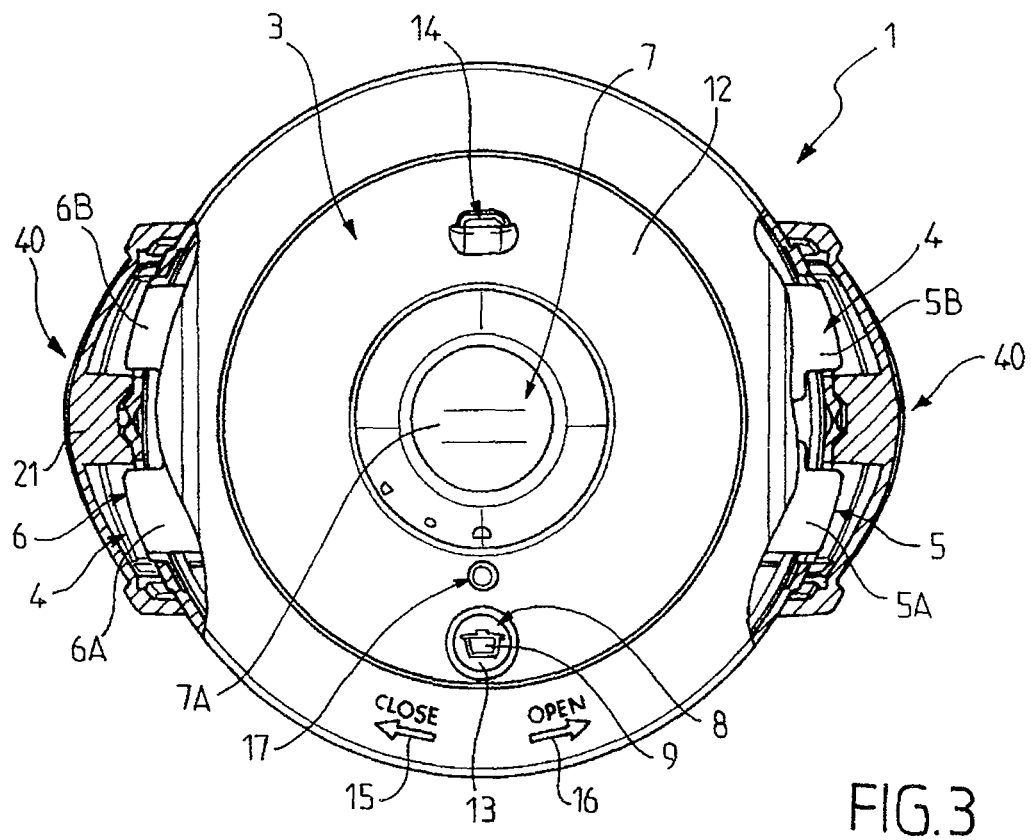
FIG. 3 illustrates, according to a partially cross sectioned and revealed top view, the pressure cooker of FIGS. 1 and 2 whose control means are this time positioned in a "locked and sealed" position.
Figure 5:
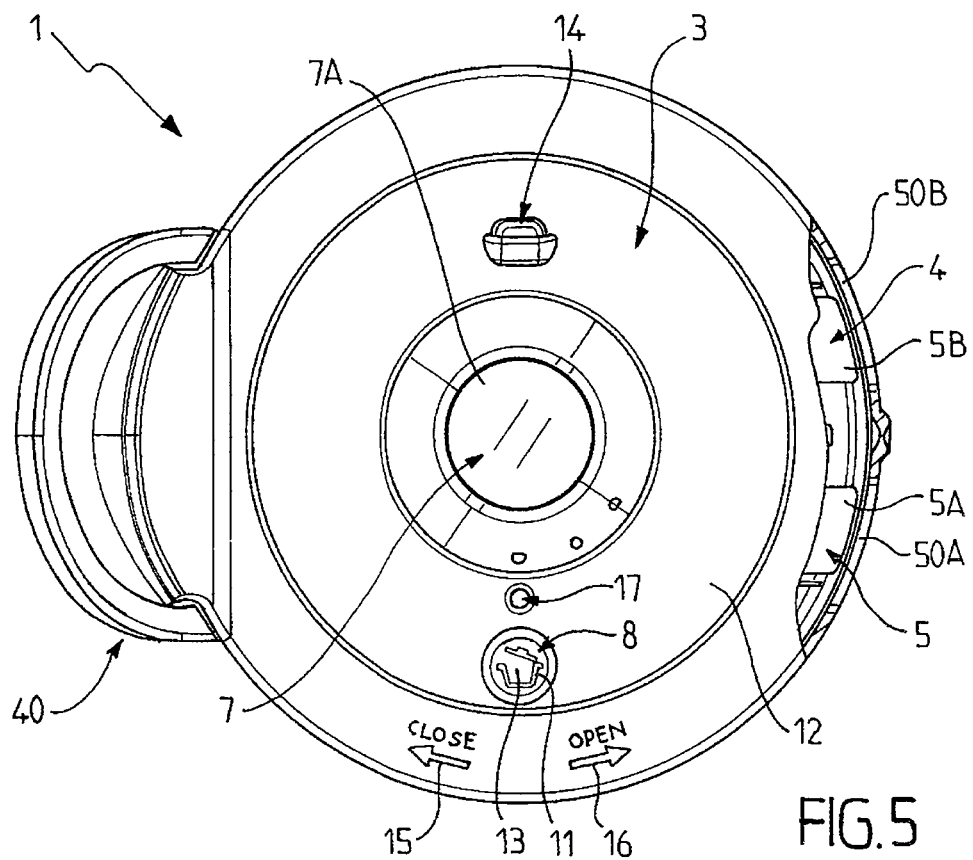
FIG. 5 illustrates, according to a partially cross sectioned and revealed top view, the pressure cooker of FIGS. 1 to 4 whose control means are in the open position.
Figure 6:
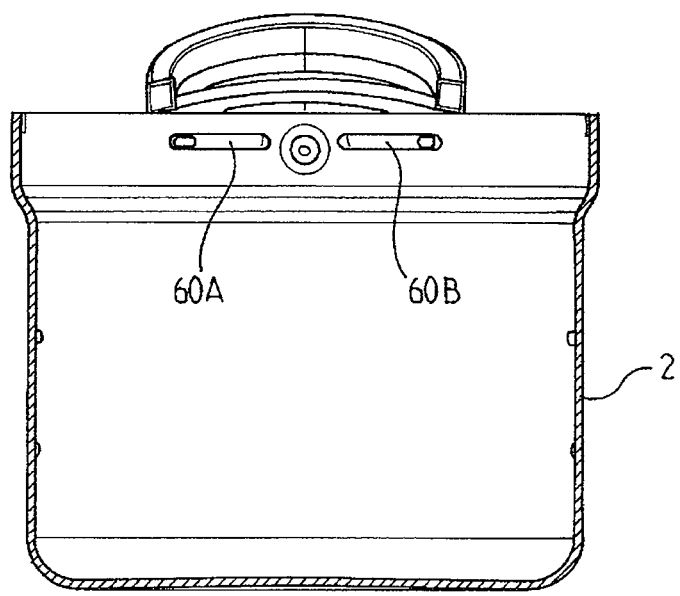
FIG. 6 illustrates, according to a lateral cross sectional view, the pressure cooker illustrated in the FIGS. 1 to 5.

The user then rotates the knob 7A in a clockwise direction with respect to the reference line of the FIG. 5 (direction shown by the arrow 15, and of which the presence on the lid 3 is purely optional) until a stop position is reached corresponding to the locked and sealed position of the pressure cooker 1 (illustrated in FIG. 3). The rotation of the knob 7A between its position in FIG. 5 and that in FIG. 3 concomitantly causes the rotation of the indicator part 13, and consequently the part 13 to pass before the window 8 (which remains immobile) until appears in said window 8, when the knob 7A is immobilised in its position illustrated in FIG. 3, the pictogram 9 symbolising the locked and sealed position. By passing from its open position to its locked and sealed position, the knob 7A passes via the locked and decompression position, but does not stop there.

Once the knob 7A is placed stably in the locked and sealed position (shown in FIG. 3), the pressure cooker 1 is subjected to external heat, applied by a source such as a cooking hob, and may consequently increase in pressure until it reaches its operating pressure, which is regulated, in a manner that is itself known, by a regulating valve 14.

Figure 4:
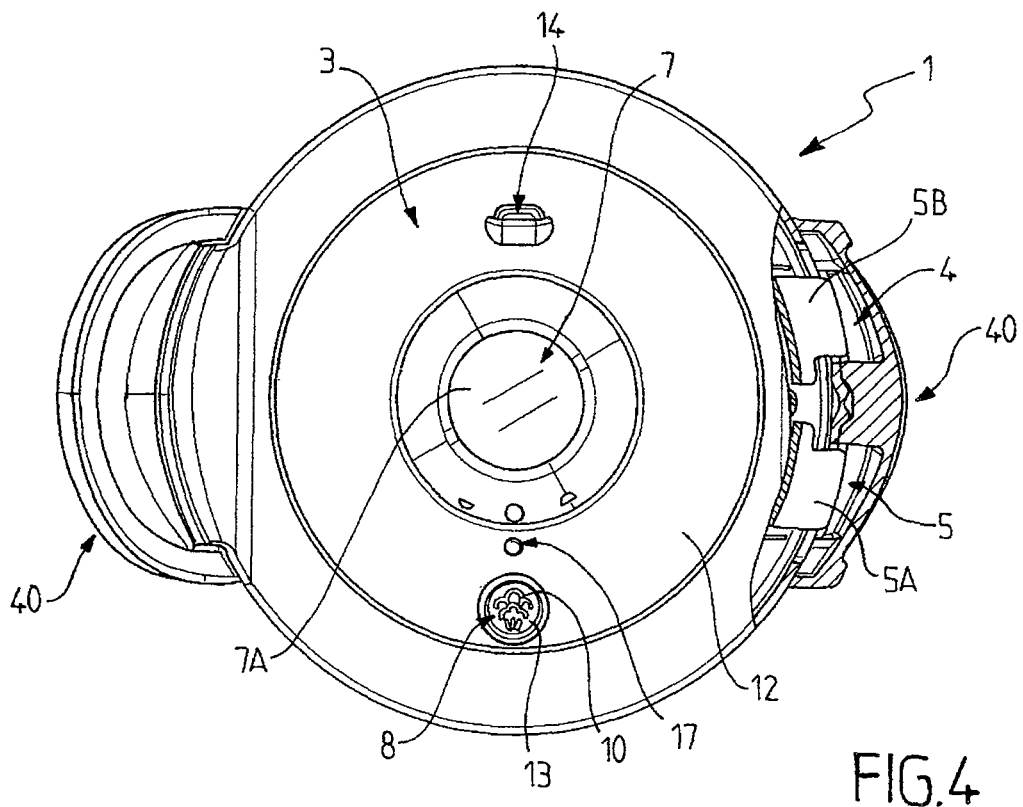
FIG. 4 illustrates, according to a partially cross sectioned and revealed top view, the pressure cooker of FIGS. 1 to 3 whose control means are in the locked and decompression position.

At the end of the cooking cycle, the user rotates the knob 7A in an anticlockwise direction with respect to the reference line of the figures (direction shown by the arrow 16 in FIGS. 3 and 5), until the knob 7A stops its travel in a stop position corresponding to the locking and decompression position illustrated in FIG. 4. This stop position is obtained by the use of a safety pin 17 that is pressure sensitive. In a manner known in itself, as long as the internal pressure (inside the chamber) is higher than a predetermined level compatible with the safe opening of the lid, this pin 17 remains in a raised position which prevents the knob 7A from continuing its angular travel to the open position illustrated in FIG. 5. As illustrated in FIG. 4, the pictogram 10 illustrating the locked and decompression position is then aligned with the window 8.

Then, when the internal pressure inside the chamber drops below the predetermined safety pressure compatible with the safe opening of the lid, the safety pin 17 returns to its lowered position and allows the user to turn knob 7A again in an anticlockwise direction until the open position (illustrated in FIG. 5) is reached, which authorises the opening of the lid in complete safety.

The invention claimed is:

1. Domestic cooking pot (1) comprising a pan (2) and a lid (3) for covering said pan, and including control means (7) for controlling at least part of the operation of the cooking pot, wherein said control means (7) are mounted on said pot and are movable between a plurality of positions, wherein said cooking pot (1) is further fitted with an information window (8) and at least one indicator that is representative of one of the positions of the control means (7), said control means (7) being connected to the indicator so as to cause the indicator to appear in said window when the control means (7) are in said one of the positions; said control means being movable between at least a first and a second position and said pot includes locking/release means (4) of the lid (3) onto the pan (2), wherein the control means (7) permit the user to control at least these locking/release means (4) so that the first position corresponds to the locking and the second position corresponds to the release in which the control means (7) are movable between at least a third and a fourth position and said pot includes a decompression part that may be activated or deactivated, wherein the control means (7) permit the user to control at least this decompression part so that when the control means (7) occupies its third position the decompression part is deactivated whereas when the control means (7) occupies its fourth position, the decompression part is activated.

2. The domestic cooking pot (1) according to claim 1 in which the control means (7) are designed to be manually actuated by the user.

3. The domestic cooking pot (1) according to claim 1 in which said pan (2) and lid (3) form a cooking chamber.

4. The domestic cooking pot (1) according to claim 3 in which the control means (7) and the information window (8) are mounted on the lid (3).

5. The domestic cooking pot (1) according to claim 1 in which said pot comprises a display (40) to hide the locking/release means (4) of the lid (3) on the pan (2) from the view of the user when the lid (3) is added onto the pan (2).

6. The domestic cooking pot (1) according to claim 1 in which the first and third positions are the same and the second and fourth positions are the same.

7. The domestic cooking pot (1) according to claim 1 in which said indicator is a visual indicator.

8. The domestic cooking pot (1) according to claim 1 in which said pot comprises a plurality of indicators wherein each of them are representative of a respective position of the control means (7).

9. The domestic cooking pot (1) according to claim 1 in which said pot comprises a cover (12) in which an opening is fitted that forms the information window (8) and an indicator part (13) bearing at least said indicator wherein the cover (12) and the indicator part (13) are movable with respect to one another, wherein the control means (7) have a plurality of possible positions and are designed to control the relative movement of the cover (12) and the indicator part (13) so that said indicator is aligned with the window (8) when the control means (7) are in said one of the positions.

10. The domestic cooking pot (1) according to claim 9 in which the viewing window (8) is fixed in position while the indicator part (13) is movable and connected to the control means (7) so that the latter controls its movement.

11. The domestic cooking pot (1) according to claim 9 in which the indicator part (13) is rotatable.

12. The domestic cooking pot (1) according to claim 1 in which the control means (7) are rotatable.

13. The domestic cooking pot (1) according to claim 1 in which said indicator is a pictogram.

14. A domestic cooking pot comprising a pan and a lid for covering said pan, and including control means (7) for controlling at least part of the operation of the cooking pot,
wherein said control means (7) are designed to be manually actuated by the user, are mounted on said pot and are movable between a plurality of positions
wherein said cooking pot (1) is further fitted with an information window (8) and at least one indicator that is representative of one of the positions of the control means (7), wherein the control means (7) are connected to the indicator so that manually actuating the control means (7) to place it in said one of the positions concomitantly causes said indicator to appear in said window, said control means (7) being movable between at least a first and second position, said first position indicating locking and said second position indicating unlocking; and in which the control means (7) are movable between at least a third and a fourth position and said pot includes a decompression part that may be activated or deactivated, wherein the control means (7) permit the user to control at least this decompression part so that when the control means (7) occupies its third position the decompression part is deactivated whereas when the control means (7) occupies its fourth position, the decompression part is activated.

15. The domestic cooking pot as defined in claim 14 in which said control means are mounted on said lid.

16. The domestic cooking pot as defined in claim 14 in which said pot includes a decompression part that can be activated to release pressure in said pot and deactivated to allow pressure to increase in said pot in response to heat applied during cooking.

17. The domestic cooking pot as defined in claim 16 in which one of the positions of said indicator signals to the user through said window the activated or deactivated state of said decompression part.

18. The domestic cooking pot (1) according to claim 14 in which the first and third positions are the same and the second and fourth positions are the same.

\* \* \* \* \*